US012701288B2

(12) United States Patent
    Arling

(10) Patent No.: US 12,701,288 B2
(45) Date of Patent: *Aug. 4, 2026

(54) SYSTEM AND METHOD FOR AUTOMATIC CHANNEL LINEUP DETERMINATION

(71) Applicant: Universal Electronics Inc., Scottsdale, AZ (US)

(72) Inventor: Paul D. Arling, Scottsdale, AZ (US)

(73) Assignee: Universal Electronics Inc., Scottsdale, AZ (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/655,529

(22) Filed: May 6, 2024

(65) Prior Publication Data

US 2024/0292054 A1    Aug. 29, 2024

Related U.S. Application Data

(63) Continuation of application No. 13/793,519, filed on Mar. 11, 2013, now Pat. No. 11,997,347.

(51) Int. Cl.
| | |
|---|---|
| *H04N 21/454* | (2011.01) |
| *H04N 21/41* | (2011.01) |
| *H04N 21/414* | (2011.01) |
| *H04N 21/438* | (2011.01) |
| *H04N 21/442* | (2011.01) |
| *H04N 21/45* | (2011.01) |
| *H04N 21/482* | (2011.01) |

(52) U.S. Cl.
CPC ... *H04N 21/4383* (2013.01); *H04N 21/41265* (2020.08); *H04N 21/41407* (2013.01); *H04N 21/442* (2013.01); *H04N 21/4524* (2013.01); *H04N 21/454* (2013.01); *H04N 21/482* (2013.01)

(58) Field of Classification Search
CPC ......... H04N 21/4383; H04N 21/41265; H04N 21/41407; H04N 21/442; H04N 21/4524; H04N 21/454; H04N 21/482
USPC .......................................................... 725/56
See application file for complete search history.

(56) References Cited

U.S. PATENT DOCUMENTS

| | | | |
|---|---|---|---|
| 10,405,015 | B2 | 9/2019 | Kite |
| 2008/0022298 | A1 | 1/2008 | Cavicchia |
| 2008/0081640 | A1 | 4/2008 | Tran |

(Continued)

FOREIGN PATENT DOCUMENTS

| | | |
|---|---|---|
| CN | 102630047 A | 8/2012 |
| EP | 0938784 B1 | 5/2006 |

(Continued)

OTHER PUBLICATIONS

Examination Report issued on EP patent application No. 14780150.0, dated Jun. 19, 2018, 6 pages.

(Continued)

*Primary Examiner* — Dominic D Saltarelli
(74) *Attorney, Agent, or Firm* — Greenberg Traurig, LLP

(57) ABSTRACT

A current geographical location of a portable device is used to facilitate selection of channel lineup that is appropriate for a Multi-System Operator (MSO) provider and the current geographical location of the portable device. A program guide GUI of the portable device is then configured using the selected channel lineup. The configured GUI is displayable to a user of the portable device whereupon the configured GUI is available for use in commanding tuning operations of a set-top box.

16 Claims, 4 Drawing Sheets

(56)                    References Cited

U.S. PATENT DOCUMENTS

| | | |
|---|---|---|
| 2008/0163330 A1 | 7/2008 | Sparrell |
| 2009/0009532 A1 | 1/2009 | Hallberg |
| 2010/0199299 A1 | 8/2010 | Chang |
| 2010/0311399 A1 | 12/2010 | Cusick |
| 2011/0258271 A1 | 10/2011 | Gaquin |
| 2011/0283333 A1 | 11/2011 | Ukkadam |
| 2012/0130971 A1 | 5/2012 | Morris |
| 2012/0151525 A1 | 6/2012 | Demchenko |
| 2013/0047174 A1 | 2/2013 | Lee |

FOREIGN PATENT DOCUMENTS

| | | | |
|---|---|---|---|
| EP | 2339832 | B1 | 4/2015 |
| JP | 2003158730 | A | 5/2003 |
| WO | 03003723 | A1 | 1/2003 |
| WO | 03063475 | A1 | 7/2003 |

OTHER PUBLICATIONS

Examination report issued on European patent application No. 14780150.0, dated May 6, 2019, 4 pages.
Extended European Search Report issued on EP patent application No. 14780150.0, dated Apr. 11, 2016, 20 pages.
International Search Report and Written Opinion issued on PCT Application No. US14/23156, mailed May 7, 2014, 10 pages.
Office action issued on Brazilian patent application No. BR112015021110.0 , received Jul. 29, 2020, 3 pages.
Office Action issued on Chinese patent application No. 201480013569. X, received Aug. 24, 2018, 7 pages.
Supplementary European Search Report issued on EP patent application No. 14780150.0, dated Feb. 1, 2016, 7 pages.

SYSTEM AND METHOD FOR AUTOMATIC CHANNEL LINEUP DETERMINATION

RELATED APPLICATION INFORMATION

This application claims the benefit of U.S. application Ser. No. 13/793,519, filed on Mar. 11, 2013, which application is incorporated herein by reference in its entirety.

BACKGROUND

Personal communication, productivity, and entertainment devices such as tablet computers, smart phones, portable email devices, e-books, hand-held games and/or game controllers, portable media players, etc. (all referred to hereafter as "smart devices") are known to include features such as graphical user interfaces on color touch screens, wireless Internet capability, global positioning systems (GPS), etc., and support for ancillary applications (sometimes referred to as "apps") such as, for example, calendars, email, maps, etc. Such ancillary applications may be pre-installed in a smart device or may be made available for download by a user. Certain of these apps may comprise the presentation of media program guide information to a user, either as a standalone feature or in conjunction with an ability to issue media stream selection commands to consumer electronic entertainment appliances in response to user inputs.

SUMMARY

The following relates generally to improved methods for configuration of a smart device program guide app and, more particularly, to methods for presenting a graphical user interface (GUI) on a portable device, e.g. a smart device, which may utilize a Multi-System Operator (MSO) map— which correlates MSOs to geographic locations—to identify the MSO provider and display a channel lineup appropriate to that MSO. To this end, in some embodiments an exemplary smart device app may utilize any convenient method for determining the current geographical location of the smart device, such as for example and without limitation a built-in GPS receiver system; hybrid mobile phone geo-positioning as described for example in U.S. Patent Publication No. 2011/0294515, incorporated herein by reference in its entirety; determination of position information based on multiple sources such as described in U.S. Pat. No. 6,714,865, also incorporated herein by reference in its entirety; or any other means as appropriate for a particular embodiment. In certain embodiments, an exemplary smart device app may also communicate with other appliances present in the local environment, for example a cable or satellite STB, in conjunction with or in place of the location determination techniques described above, in order to determine and/or further refine an appropriate channel lineup for display to the user.

Exemplary smart devices include but are not limited to Apple's "iPhone" and "iPad," Google's "Android" platform, Nintendo's "Wii U" controller, Blackberry's "Torch" or "PlayBook," and various other tablet computers and/or smart phones. In one described aspect, a smart device application may be furnished with a touch screen GUI and contain activatable icons which approximate the layout of the MSO's channel lineup. Since differences in keypad size, form factor, or GUI aesthetics may necessitate that only a portion of the channel lineup be displayed at any one time, a user may be provided with a means to scroll within the GUI display. The GUI may contain a confirmation screen or confirmation icon to allow the user to confirm that the MSO has been identified correctly via the location data obtained from the GPS location data and the MSO map. A better understanding of the objects, advantages, features, properties and relationships of the various aspects described hereinafter will be obtained from the following detailed description and accompanying drawings which set forth illustrative embodiments and which are indicative of the various ways in which the principles of the invention claimed hereinafter may be employed.

BRIEF DESCRIPTION OF THE DRAWINGS

For a better understanding of the claimed invention, reference may be had to preferred embodiments shown in the attached drawings in which:

DETAILED DESCRIPTION

Figure 1:
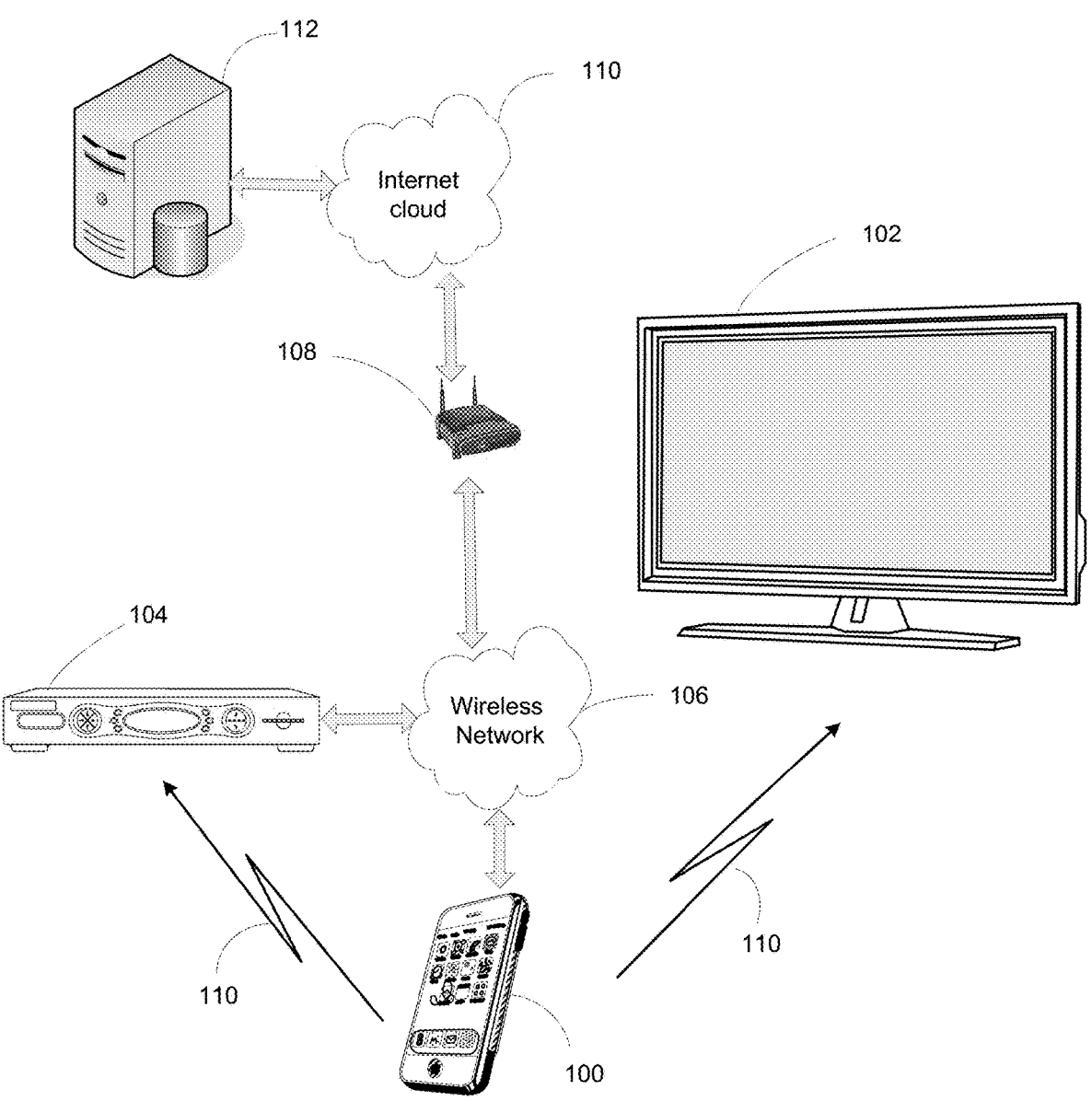
FIG. 1 illustrates an exemplary system in which a smart device is a member of a wireless network and in which the smart device is equipped with a location aware app constructed according to the description that follows.
Figure 2:
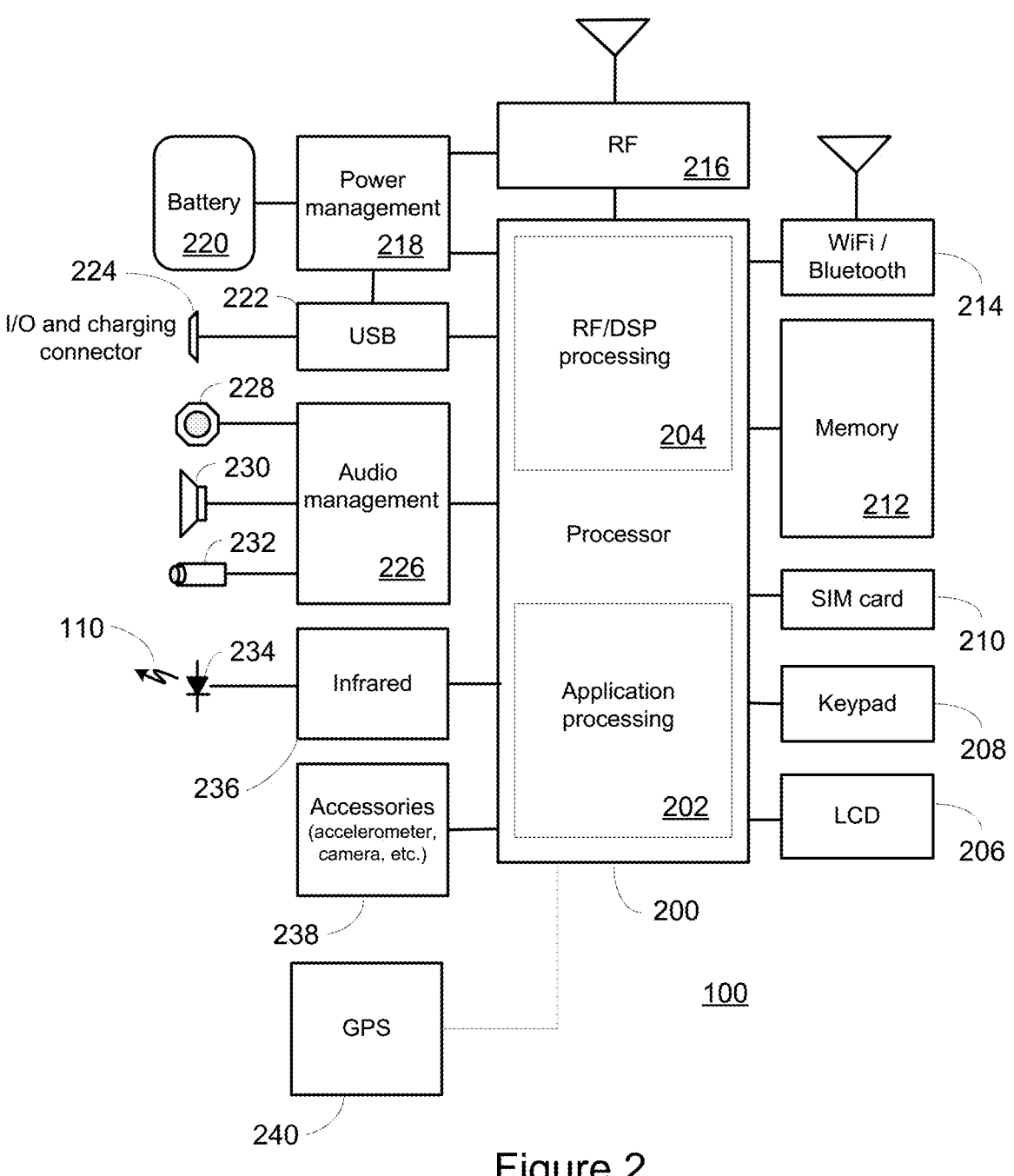
FIG. 2 illustrates in block diagram form exemplary components of the exemplary smart device of FIG. 1.

FIG. 1, illustrates an exemplary system wherein a smart device 100 may be adapted to issue commands to one or more controllable appliances such as a TV 102, a set top box (STB) 104, etc. While illustrated in the context of a home entertainment system comprising a TV 102, STB 104, a wireless network 106, an internet gateway device 108, the internet cloud 110, an MSO network database, accessible via the internet cloud, in which may be stored MSO service information, GPS location data, including zip code data, and channel guide data corresponding to said MSO, it is to be understood that controllable appliances may include, but need not be limited to, televisions, cable or satellite converter set-top boxes, cable ready devices, personal computers, etc. In an alternative embodiment, a smart device 100 may include a GPS app, a STB discovery app, and a GUI enabling the user to interface with the smart device. The exemplary embodiment may contain the necessary hardware to enable direct transmission of commands to appliances 102 and 104 which may be capable of joining a wireless network 106, for example without limitation the technology described in U.S. patent application Ser. No. 13/043,915 which is incorporated herein by reference in its entirety. As is known in the art, appliance commands may be issued in the form of infrared signals 110 as illustrated, or in any other suitable format, e.g., via an RF signal such as contemplated by RF4CE, Zwave, Bluetooth, etc.; ultrasonic signal; visible light; etc. as appropriate for the control of each particular appliance With reference to FIG. 2, as is known in the art, a smart device 100 may include as needed for a particular application, processing means 200 which may comprise both an application processing section 202 and an RF/DSP processing section 204; an LCD display 206; a keypad 208 which may comprise physical keys, touch keys overlaying LCD 206, or a combination thereof; a subscriber identification module (SIM) card 210; memory means 212 which may comprise ROM, RAM, Flash, or any combination thereof; WiFi and/or Bluetooth wireless interface(s) 214; a wireless telephony interface 216; power management circuitry 218 with associated battery 220; a USB interface 222 and connector 224; an audio management system 226 with associated microphone 228, speaker 230, and headphone jack 232; optional IR communication means comprising a transmitter and/or receiver 236 with associated IR output diode(s) 234, various optional accessory features 238 such as a digital camera, accelerometer, etc., and a GPS 240.

Figure 3:
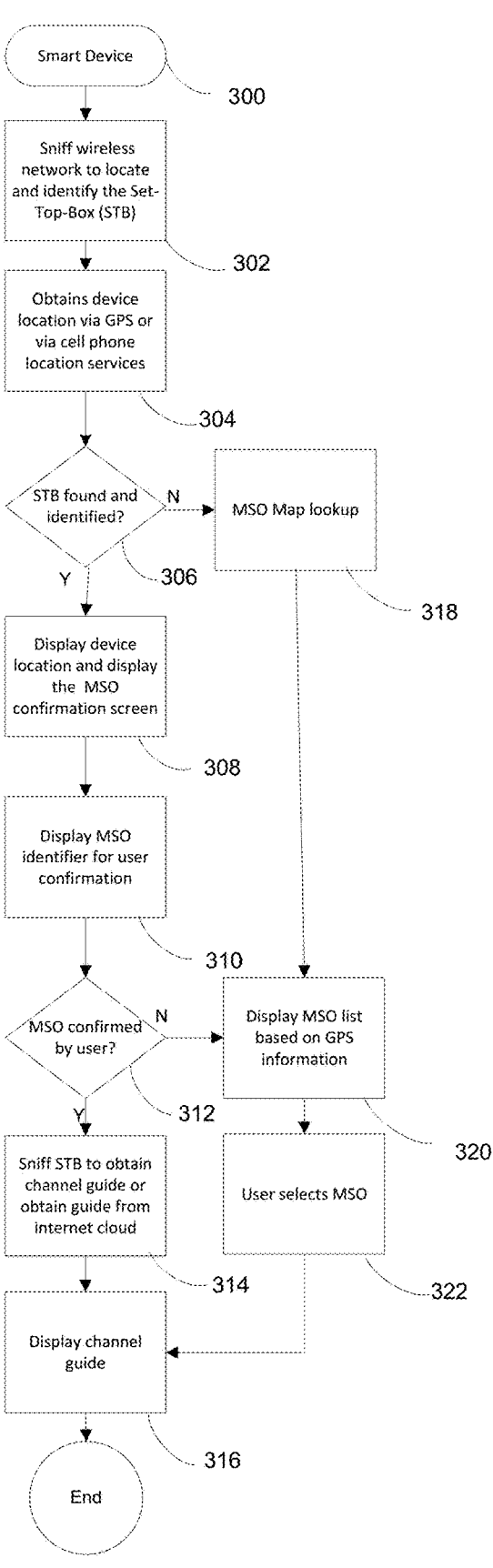
FIG. 3 illustrates in flow chart form an exemplary method for identifying an MSO and channel line-up using data provided by a STB and/or location data from the smart device.

With reference to FIG. 3, a smart device 100 may initiate an app in step 300 that functions to determine if the smart device 100 is within the range a wireless network 106. If the smart device 100 becomes, or is already, a member of said network 106, the app may then initiate a wireless sniff 302 to thereby locate and properly identify a STB 104 which may also be a member of the same wireless network 106. For example, the smart device 100 may connect to its home wireless network 106 and the target STB 104, also being a member of that network 106, may identify itself to the smart device 100 or be requested to identify itself to the smart device 100. During this process, the smart device 100 is also caused to determine 304 its own device location, via use of GPS services, via cell phone location services, and/or the like. While not required, the smart device app may cause the determined smart device location to be displayed to thereby allow the user to confirm that location 308. After the user confirms the location (if applicable), the MSO identifier, logo, name, etc. for the appropriate MSO, i.e., the MSO that is appropriate based on the device location and received STB identifier data 306, may be displayed within a GUI confirmation screen 308 to allow the user to optionally confirm the MSO identifier 310. The optional confirmation screen may contain a GUI which may contain text indicative of a positive or a negative confirmation which may be in the form of a touch type key that may be pressed by the user to initiate the confirmation 312. The app then may initiate a STB wireless sniff and/or issue a server request to obtain the channel guide for the MSO from the STB and/or internet cloud 314 as needed. The received channel guide data 316 may then be displayed within the GUI of the smart device.

If the STB identifier data is not received or cannot otherwise be obtained during the wireless sniff 302, the app may utilize the device location alone to perform an MSO map lookup 318 which may contain a listing of the MSO availability for that location 320. The app may then graphically display the MSO list and may allow the user to select the proper MSO 322 via the on-screen GUI. The app may then obtain, via a wireless internet service or from the smart device memory 212 and display the channel guide, or channel lineup, for the corresponding MSO. For example, if the corresponding MSO was identified as DirecTV, the proper channel guide for DirecTV may be displayed within the smart device screen and each of the channels (e.g., displayed channel logo icons) may be activated by the user performing a key press or key touch. The smart device 100 may then respond to a channel activation by causing a control instruction mapped thereto to be transmitted from the smart device 100 for the purpose to causing the STB or TV to take action and execute the control instruction which may result in the channel being properly tuned to by the intended target appliance. Furthermore, it is to be understood that in certain embodiments the channel guide information may be obtained from, but need not be limited to, sources such as internet services, other apps, stored within the STB data, streamed from the STB, etc.

Figure 4:
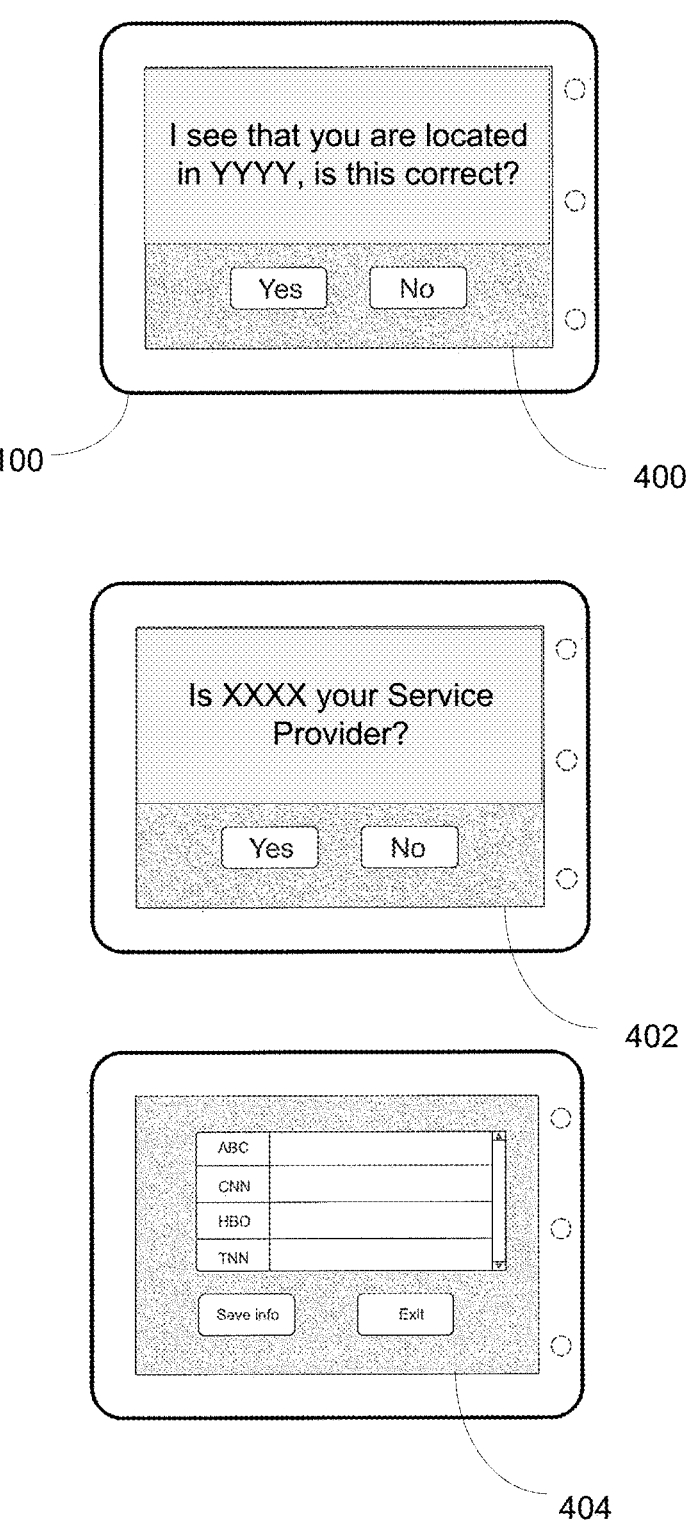
FIG. 4 illustrates an exemplary system in which a smart device equipped with a touch screen is adapted to display a user interface for user interaction.

FIG. 4 illustrates an exemplary smart device 100 equipped with an LCD touch screen 206 which may be adapted to display a user interface for user interaction wherein the app causes the smart device location to be displayed to allow the user to confirm said location via text or location map. The notation YYYY in the GUI confirmation screen 400 is meant to illustrate that the location information can be presented in any desired format. For example, location information may be displayed in a format such as town or city name, state, e.g., Irvine, CA, Denver, CO, etc. The confirmation screen may also contain GUI elements which may contain text indicative of a positive or a negative confirmation which may be in the form of a touch type key that may be pressed by the user to initiate the confirmation as illustrated in touch key types indicating, a positive confirmation, and a negative confirmation. The GUI screen may also display a service provider confirmation screen 402. The notation XXXX in the GUI confirmation screen 402 is again meant to illustrate that the MSO can be presented in any desired format. For example, the MSO can be displayed to the user using the MSO name, logo etc., e.g., Comcast, DirecTV, etc. This confirmation screen may similarly contain GUI elements which may contain text indicative of a positive or a negative confirmation which may be in the form of a touch type key that may be pressed by the user to initiate the confirmation as illustrated in touch key types indicating, a positive confirmation, and a negative confirmation. The GUI screen is further used to display a channel guide or channel lineup 404 corresponding to the MSO. The displayed channel guide information, once provided to the smart device 100, can be locally stored within the smart device 100 where it will be associated with the home wireless network and/or the identity of the set top box 102. In this manner, channel guide information need not be obtained anew each and every time the smart device 100 is introduced onto the wireless network 106. Rather, channel guide information may be obtained anew upon the smart device app determining that the presently stored guide information is stale, e.g., by considering dates and times within the guide data as compared to current device time. It will be further appreciated that smart device 100 or app may store multiple sets of channel lineup data which may correspond to multiple MSO's and correspond to multiple STB types.

While various concepts have been described in detail, it will be appreciated by those skilled in the art that various modifications and alternatives to those concepts could be developed in light of the overall teachings of the disclosure. For example, in an alternate embodiment, the STB identifier may be pre-installed upon the initial configuration of the smart device and may include the channel guide data along with the service plan type or service package allocated to the user. It will also be appreciated that a detailed discussion of the actual implementation of each MSO channel guide is not necessary for an enabling understanding of the invention. Rather, the actual implementation of channel tuning is well understood in the art, given the disclosure herein of the attributes, functionality, and inter-relationship of the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof. All patents cited within this document are hereby incorporated by reference in their entirety.

What is claimed is:

1. A non-transitory, computer-readable media having stored thereon instructions executable by a portable device for configuring a program guide graphical user interface (GUI) on the portable device, the instructions causing the portable device to perform steps comprising:

obtaining from an unsolicited communication sent by a set-top box an identity of the set-top box;

determining a current geographical location of the portable device;

using the identity of the set-top box in combination with the determined current geographical location of the portable device to automatically identify within a Multi-System Operator (MSO) map, in which each of a plurality of MSO providers is correlated to a geographical location and a set-top box identity, a single one of the plurality of MSO providers;

automatically identifying a channel lineup for the identified one of the plurality of MSO providers and the determined current geographical location of the portable device; and automatically configuring the program guide GUI on the portable device whereby the selected channel lineup is displayable to a user of the portable device for use in commanding tuning operations of the set-top box.

2. The non-transitory, computer-readable media as recited in claim 1, wherein the current geographical location of the portable device is determined using a GPS device resident on the portable device.

3. The non-transitory, computer-readable media as recited in claim 1, wherein the current geographical location of the portable device is determined using an external location service.

4. The non-transitory, computer-readable media as recited in claim 1, wherein the instructions cause the portable device to retrieve the selected channel lineup from the set-top box.

5. The non-transitory, computer-readable media as recited in claim 1, wherein the instructions cause the portable device to method retrieve the channel lineup from an Internet cloud device.

6. The non-transitory, computer-readable media as recited in claim 1, wherein the instructions cause the portable device to display indicia of the selected one of the plurality of MSO providers for confirmation by the user.

7. The non-transitory, computer-readable media as recited in claim 1, wherein the instructions cause the portable device to display indicia of the determined geographic location of the portable device for confirmation by the user.

8. The non-transitory, computer-readable media as recited in claim 1, wherein the instructions cause the portable device to periodically cause the selected channel lineup to be updated.

9. A method performed by a portable device for configuring a program guide graphical user interface (GUI) on the portable device, comprising:

obtaining from an unsolicited communication sent by a set-top box an identity of the set-top box;

determining a current geographical location of the portable device;

using the identity of the set-top box in combination with the determined current geographical location of the portable device to automatically identify within a Multi-System Operator (MSO) map, in which each of a plurality of MSO providers is correlated to a geographical location and a set-top box identity, a single one of the plurality of MSO providers;

automatically identifying a channel lineup for the identified one of the plurality of MSO providers and the determined current geographical location of the portable device; and automatically configuring the program guide GUI on the portable device whereby the selected channel lineup is displayable to a user of the portable device for use in commanding tuning operations of the set-top box.

10. The method as recited in claim 9, wherein the current geographical location of the portable device is determined using a GPS device resident on the portable device.

11. The method as recited in claim 9, wherein the current geographical location of the portable device is determined using an external location service.

12. The method as recited in claim 9, wherein the instructions cause the portable device to retrieve the selected channel lineup from the set-top box.

13. The method as recited in claim 9, wherein the instructions cause the portable device to method retrieve the channel lineup from an Internet cloud device.

14. The method as recited in claim 9, comprising displaying indicia of the selected one of the plurality of MSO providers for confirmation by the user.

15. The method as recited in claim 9, comprising displaying indicia of the determined geographic location of the portable device for confirmation by the user.

16. The method as recited in claim 9, comprising periodically causing the selected channel lineup to be updated.

* * * * *